(12) United States Patent
Park

(10) Patent No.: US 9,487,203 B2
(45) Date of Patent: Nov. 8, 2016

(54) BRAKE ACTUATOR

(71) Applicant: G&P AUTOMOTIVE CO., LTD., Jeollabuk-do (KR)

(72) Inventor: Han Joo Park, Jeollabuk-do (KR)

(73) Assignee: G&P AUTOMOTIVE CO., LTD., Jeollabuk-do (KR)

( * ) Notice: Subject to any disclaimer, the term of this patent is extended or adjusted under 35 U.S.C. 154(b) by 318 days.

(21) Appl. No.: 14/247,476

(22) Filed: Apr. 8, 2014

(65) Prior Publication Data

US 2014/0305300 A1     Oct. 16, 2014

(30) Foreign Application Priority Data

Apr. 10, 2013   (KR) .................. 10-2013-0039232

(51) Int. Cl.
*B60T 17/08*     (2006.01)

(52) U.S. Cl.
CPC ............ *B60T 17/083* (2013.01); *B60T 17/086* (2013.01); *B60T 17/088* (2013.01)

(58) Field of Classification Search
CPC ... B60T 17/083; B60T 17/085; B60T 17/086
USPC ............................................................ 92/63
See application file for complete search history.

(56) References Cited

U.S. PATENT DOCUMENTS

| | | | | |
|---|---|---|---|---|
| 5,623,863 A | * | 4/1997 | Plantan | B60T 17/086 92/130 A |
| 5,676,036 A | * | 10/1997 | Choinski | B60T 17/085 92/128 |
| 6,148,711 A | * | 11/2000 | Stojic | B60T 17/083 137/509 |

FOREIGN PATENT DOCUMENTS

EP             2242673 B1 †   3/2012
TR   WO 2009085024 A2 *    7/2009  ............. B60T 17/08

\* cited by examiner
† cited by third party

*Primary Examiner* — Thomas E Lazo

(57) ABSTRACT

The present disclosure is directed to ensuring a brake to be smoothly locked and released by preventing an air pressure of a spring chamber or a pressure chamber of an air operated brake actuator from being excessively compressed, and also solving a buckling phenomenon of a compression spring.

8 Claims, 18 Drawing Sheets

BRAKE ACTUATOR

CROSS-REFERENCE TO RELATED APPLICATION

This application claims priority of Korean Patent Application No. 10-2013-0039232, filed on Apr. 10, 2013, in the KIPO (Korean Intellectual Property Office), the disclosure of which is incorporated herein entirely by reference.

BACKGROUND OF THE INVENTION

1. Field of the Invention

The present disclosure relates to a brake actuator.

2. Description of the Related Art

An air brake system for vehicles such as buses, trucks, trailers, other heavy vehicles or the like includes a brake shoe, and a drum assembly operated by an actuator assembly by selectively applying a compressed air.

General air brake actuator includes both a service brake actuator for applying a compressed air to operate a brake in a general running state, and a spring-type emergency brake actuator for operating the brake when the air pressure is released.

The emergency brake actuator includes a strong compression spring for applying a pressure to the brake when the air pressure is released.

This is also called a spring brake.

The air operated brake actuator may have a piston type or a diaphragm type.

In the diaphragm type, a brake actuator and two air-operated diaphragm brake actuators are generally disposed in a tandem vehicle shape, which includes an air operated service brake actuator for operating a general brake of a vehicle, and a spring brake actuator for operating an emergency brake or a parking brake of the vehicle.

The service brake actuator and the spring brake actuator include a housing which has an elastic diaphragm for dividing the inside of the housing into two distinguished fluid chambers.

Meanwhile, the piston brake actuator is operated in the same way as described above, except for the diaphragm, and the piston reciprocates in a cylinder for operating a parking brake of a vehicle.

In a general service brake actuator, the service brake housing is divided into a pressure chamber and a push rod chamber.

The pressure chamber is connected to a source of the compressed air to allow the fluid to flow, and the push rod chamber includes a push rod mounted thereto to connect to a brake assembly so that a compressed air is introduced into and discharged from the chamber by reciprocating the push rod into or out of the housing to lock or release the brake.

In a general spring brake actuator, the spring brake housing is divided into a pressure chamber and a spring chamber.

The pressure plate is located at a spring chamber between the strong compression spring and the diaphragm so that an opposite end of the strong compression spring is in contact with the housing.

As a known configuration, the actuator rod extends to the pressure chamber through the pressure plate and the diaphragm and also extends through a partition wall which separates the spring brake actuator from the service brake actuator.

An end of the actuator is connected the pressure chamber of the service brake actuator to allow a fluid to flow.

When the parking brake is operated, the pressure of the spring brake actuator is discharged from the pressure chamber, and the strong compression spring pushes the pressure plate and the diaphragm toward the partition wall between the spring brake actuator and the service brake actuator.

In this location, the actuator rod connected to the pressure plate operates the parking or emergency brake to be pushed so that the vehicle is forced not to move.

In order to release the parking brake, the pressure chamber is closed to the atmosphere, and the compressed air expands the pressure chamber, moves the diaphragm, and moves the pressure plate toward the opposite end of the spring brake actuator housing so that the compressed air is introduced to the pressure chamber of the spring brake actuator which compresses the strong compression spring.

However, in such a spring brake actuator, if a spring giving a great compression force is compressed, the pressure chamber increases its volume, and spring chamber decreases its volume, thereby increasing the pressure in the spring chamber.

In addition, a compressed air system for heavy vehicles is operated under a maximum industrial standard pressure, and thus the pressure generated in the spring chamber is further increased.

Due to the twinning pressure of the spring and the increased air pressure in the spring chamber, it is impossible to reach a maximum value at which the brake operates suitably.

Therefore, if the twinning pressure associated with the pressure of the spring and the generated pressure of the spring chamber approach a force applied by a maximum pressure, the brake may be not released, partially released in an unsatisfactory level, or very slowly released.

SUMMARY OF THE INVENTION

The present disclosure is directed to ensuring a brake to be smoothly locked and released by preventing an air pressure of a spring chamber or a pressure chamber of an air operated brake actuator from being excessively compressed, and also solving a buckling phenomenon of a compression spring.

In one general aspect, there is provided an air operated brake actuator, which includes: an upper housing having an opening at one end thereof and a through hole at the other end thereof; a lower housing having an opening at one end thereof and a through hole at the other end thereof; a coupling housing for coupling the upper housing and the lower housing to be fixed to each other; a piston having a through hole at a center thereof by dividing an inner side surface of the upper housing into a spring chamber and a pressure chamber; an inner fluid moving hole formed at one side of the piston to give a fluid flow path between the spring chamber and the pressure chamber of the lower housing through an actuator rod; a spring installed in the spring chamber; an actuator rod having openings at both ends so that one end is in contact with the through hole of the piston and the other end is inserted into a through hole at a top of the coupling housing; an actuator rod valve installed at a bottom of the actuator rod to adjust the flow of fluid between the spring chamber and the pressure chamber of the lower housing; a diaphragm for dividing the lower housing into a pressure chamber and a push rod chamber; a pressure plate contacting a bottom of the diaphragm to move vertically along the diaphragm; a push rod having one end perpendicularly coupled to a bottom of the pressure plate and the other end protruding outwards through the through hole of the lower housing; and a piston valve installed at the piston to adjust the flow of fluid between the spring chamber and the pressure chamber of the upper housing.

In addition, the piston valve may allow a fluid to flow through the piston valve from the pressure chamber of the upper housing to the spring chamber so that the increase of pressure at the spring chamber or the pressure chamber of the upper housing is relieved when the spring chamber or the pressure chamber of the upper housing receives a fluid pressure over a predetermined level.

In addition, a region of the upper housing where a caging bolt is received may have an S-type curve so that the spring is placed without link-to-link crosstalk while maintaining a center line thereof.

In another aspect, there is provided a moving body, which includes the air operated brake actuator.

If the brake actuator of the present disclosure is used, it is possible to guide the compression spring to be softly placed.

In addition, according to the present disclosure, a compression impact may be weakened.

Moreover, the brake actuator may more rapidly shift to a locked state by means of a piston valve.

Further, an air pressure of the spring chamber may be constantly maintained by means of an inner fluid moving hole and an actuator rod valve. Therefore, the brake may more rapidly shift from the locked state to a released state.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, the terms such as "first", "second", and the like can be used for explaining various components but such components should not be limited by these terms. These terms do not imply any particular order, but they are included to identify individual elements. For example, a first component may be called a second element, and the second element may also be called the first element, without departing from the scope of the present disclosure.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

Figure 1:
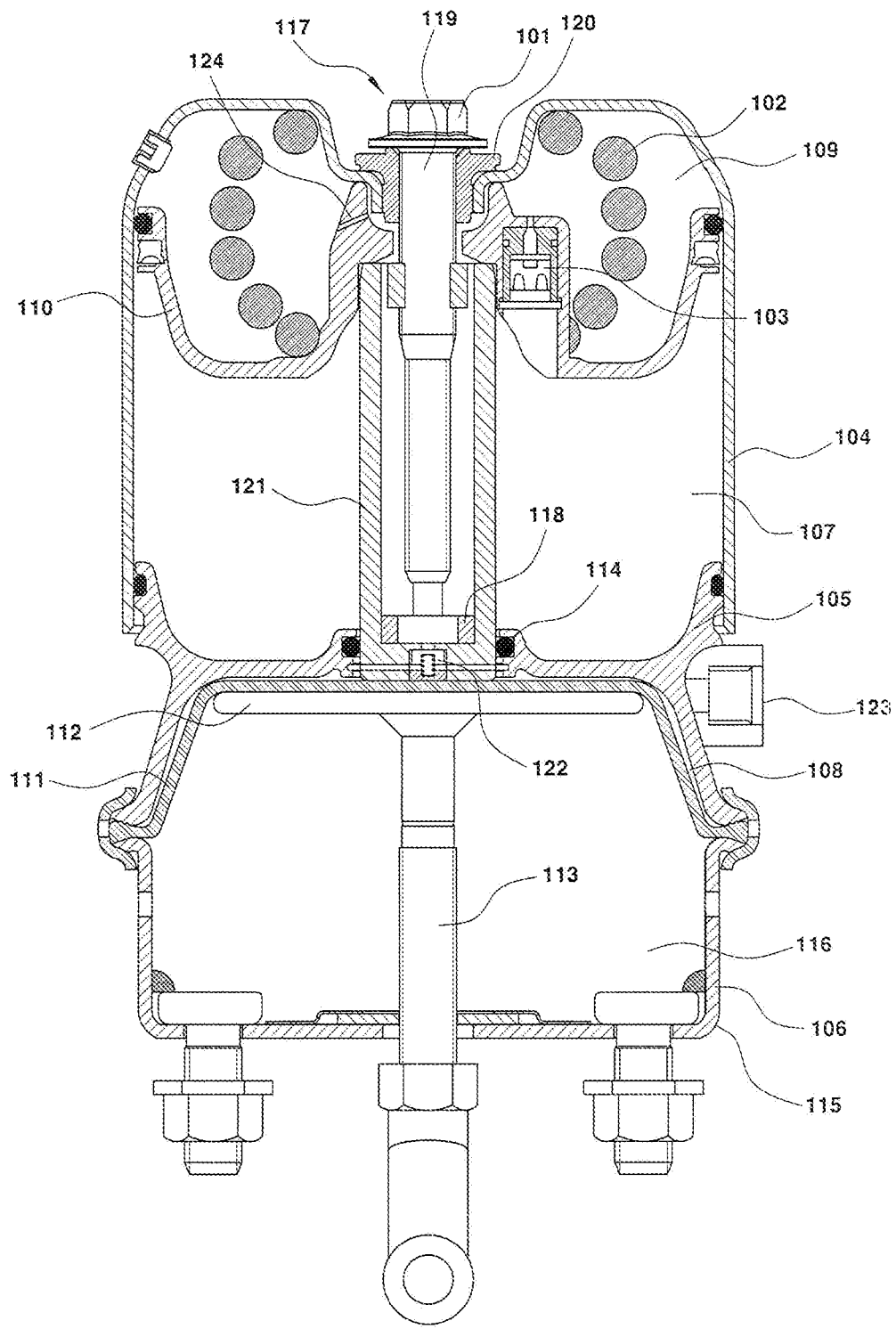
FIG. 1 is a cross-sectional view showing a brake actuator according to an embodiment of the present disclosure.

FIG. 1 is a cross-sectional view showing a brake actuator according to an embodiment of the present disclosure.

The present disclosure is directed to constantly maintaining an air pressure of each chamber such as a spring chamber and also allowing a spring to be softly placed without tilting at its center line when being compressed.

A compression spring 102 is a coil spring, and its coil diameter is gradually increasing from a lower end to a middle point in the height direction of the coil spring and is also gradually decreasing from the middle point to an upper end. A bottom portion of the compression spring 102 contacts and is supported by a piston 110, and a top portion of the compression spring 102 is closely adhered to and is supported by an S-shaped curved portion of a spring brake cover 104 to receive a caging bolt assembly 117.

The S-shaped curved portion of the spring brake cover 104, which forms the upper housing, is curved along the inner side of the spring brake cover 104 and prevents a terminal of the compression spring 102 from moving so that the spring may be always compressed while keeping its center axis constantly.

The piston 110 is closely adhered to an inside of the spring brake cover 104 to divide the spring brake into a first pressure chamber 107 and a spring chamber 109. For this, the piston 110 is closely adhered to the inside of the spring brake cover 104.

The piston 110 is moved vertically by a fluid such as air flowing in through the air supply hole 123.

In addition, a piston valve 103 is formed at the piston 110 to adjust the flow of fluid such as air between the first pressure chamber 107 and the spring chamber 109 in the spring brake cover 104. The piston valve 103 is closed when an air pressure is applied, but if an air pressure is applied, the piston valve 103 is opened to ensure free flow of the fluid such as air. In other words, while the piston 110 moves vertically as the brake is locked or released, the piston valve 103 allows an air in each chamber to flow to another chamber, thereby preventing an excessive pressure from occurring in each chamber and also ensuring the brake to be softly and smoothly locked or released. If the pressure at the spring chamber 109 or the first pressure chamber 107 exceeds a predetermined threshold pressure, the piston valve 103 allows a fluid to flow from the spring chamber 109 to the first pressure chamber 107 or from the first pressure chamber 107 to the spring chamber 109 so that the pressure in each chamber is constantly maintained. In addition, the piston valve 103 is not opened by any external force but is opened by the piston 110. Therefore, the piston valve 103 does not receive any external environmental influence while constantly maintaining the air pressure of the spring chamber 109 or the first pressure chamber 107, and thus there is substantially no fear that the brake actuator is corroded or damaged by external contaminants such as moisture or salt.

Moreover, an inner fluid moving hole 124 is formed at one side of the piston 110. The inner fluid moving hole 124 also plays a role of constantly maintaining the pressure in the spring chamber 109. In detail, the inner fluid moving hole 124 allows an excessive air of the spring chamber 109 to flow through an actuator rod 121 to a second pressure chamber 108 and discharge out of the brake actuator.

A hollow actuator rod 121 is formed in an inner through hole of the piston 110. One end of the hollow actuator rod 121 contacts and is supported by the bottom of the piston 110, and the other end contacts and is supported by a diaphragm 111 through the through hole of the adaptor housing 105.

An actuator rod valve 122 is formed at the bottom portion of the actuator rod 121. The actuator rod valve 122 plays a role of controlling the fluid such as air flowing through the piston valve 103 or the inner fluid moving hole 124, described above, to be discharged to the second pressure chamber 108. In detail, the actuator rod valve 122 is repeatedly locked and released to adjust an air pressure in the spring chamber 109.

As a result, by including the piston valve 103, the inner fluid moving hole 124 and the actuator rod valve 122 together, the brake actuator according to an embodiment of the present disclosure prevents the air pressure in each chamber from increasing over a predetermined level and also ensures the brake to be smoothly locked and released by adjusting the fluid to freely flow between chambers.

A caging bolt assembly 117 formed from an outer side of the spring brake cover 104 to an inner side thereof is provided in the hollow actuator rod 121. The caging bolt assembly 117 includes an adjustment nut 101 screwed to a caging bolt 119. The caging bolt assembly 117 disposes the caging bolt 119 and a caging bolt head 118 in the hollow actuator rod 121, extends the other end of the caging bolt 119 through an axial opening, and is fixed by threading through a collar 120 to be substantially sealed. The adjustment nut 101 is permanently fixed on the caging bolt 119. The caging bolt assembly 117 is used for mechanically shrinking and supporting the compression spring which gives a great force in a compressed state. By rotating the adjustment nut 101, the caging bolt 119 may be unscrewed from the spring brake housing. As the caging bolt 119 retreats, the caging bolt head 118 contacts a bearing at the top portion of the actuator rod 121, which pulls the actuator and the pressure plate back along the caging bolt 119, and compresses the spring. The caging of the compression spring giving a great force is known in the art and is used for mechanically releasing the brake when the compressed air system is not broken, and/or used for assembling the brake actuator.

An adaptor housing 105 is formed at the lower portion of the spring brake cover 104 to be connected and coupled to the service brake cover 106. The adaptor housing 105 has a through hole therein, and the actuator rod 121 contacts and is supported by the diaphragm 111 in the service brake cover 106 through the through hole.

A sealing assembly 114 is formed at a portion where the hollow actuator rod 121 contacts the adaptor housing 105, at an outer side of the hollow actuator rod 121 in order to prevent the fluid from leaking. In addition, an actuator rod valve 122 is provided at a bottom of the hollow actuator rod 121 to inject air into the second pressure chamber 108.

A diaphragm 111 is formed in the service brake cover 106 of the lower housing and contacts and is supported by the pressure plate 112 to divide the service brake cover 106 into a second pressure chamber 108 and a chamber of a push rod 113. The pressure plate 112 is supported by the push rod 113 and plays a role of transmitting the movement according to the air pressure of the diaphragm 111 to the push rod 113. Therefore, the diaphragm 111 moves the pressure plate 112 vertically according to an elastic force of the compression spring 102 in the spring chamber 109 and the adjustment of the air pressure in the pressure chamber, and thus the push rod 113 formed through one end of the service brake cover 106 adjusts the operation of the brake. The spring brake cover 104, the adaptor housing 105 and the service brake cover 106 configuring the outer surface of the brake actuator may be collectively called a housing 115.

Hereinafter, operations of the brake actuator according to an embodiment the present disclosure will be described.

Figure 2:
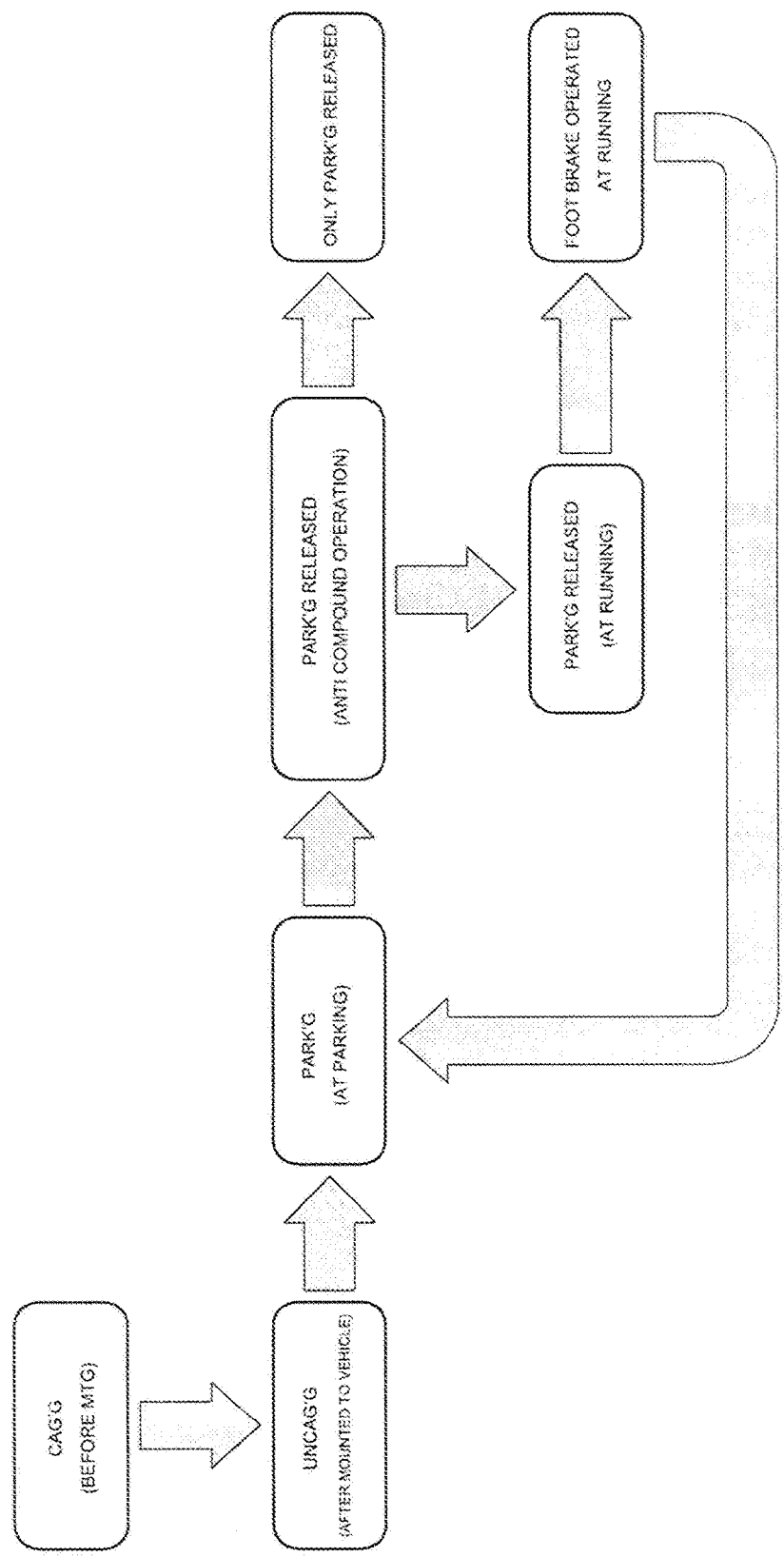
FIG. 2 is a schematic view showing an operation mode of the brake actuator according to an embodiment of the present disclosure.

FIG. 2 is a schematic view showing an operation mode of the brake actuator according to an embodiment of the present disclosure.

The brake actuator according to the present disclosure may be classified into a state before being mounted to a vehicle (CAG'G, before MTG) and a state of being mounted to a vehicle (UNCAG'G). The state of being mounted to a vehicle may be classified into a parking state (PARK'G) in which a moving body such as a vehicle is stopped by locking the brake, a released state (PARK'G released) in which the brake is released since the vehicle runs, and a running state (the foot brake is in operation while the vehicle is running) in which the brake is stepped during running to operate the brake actuator.

Hereinafter, each mode of FIG. 2 will be described in more detail.

Figure 3:
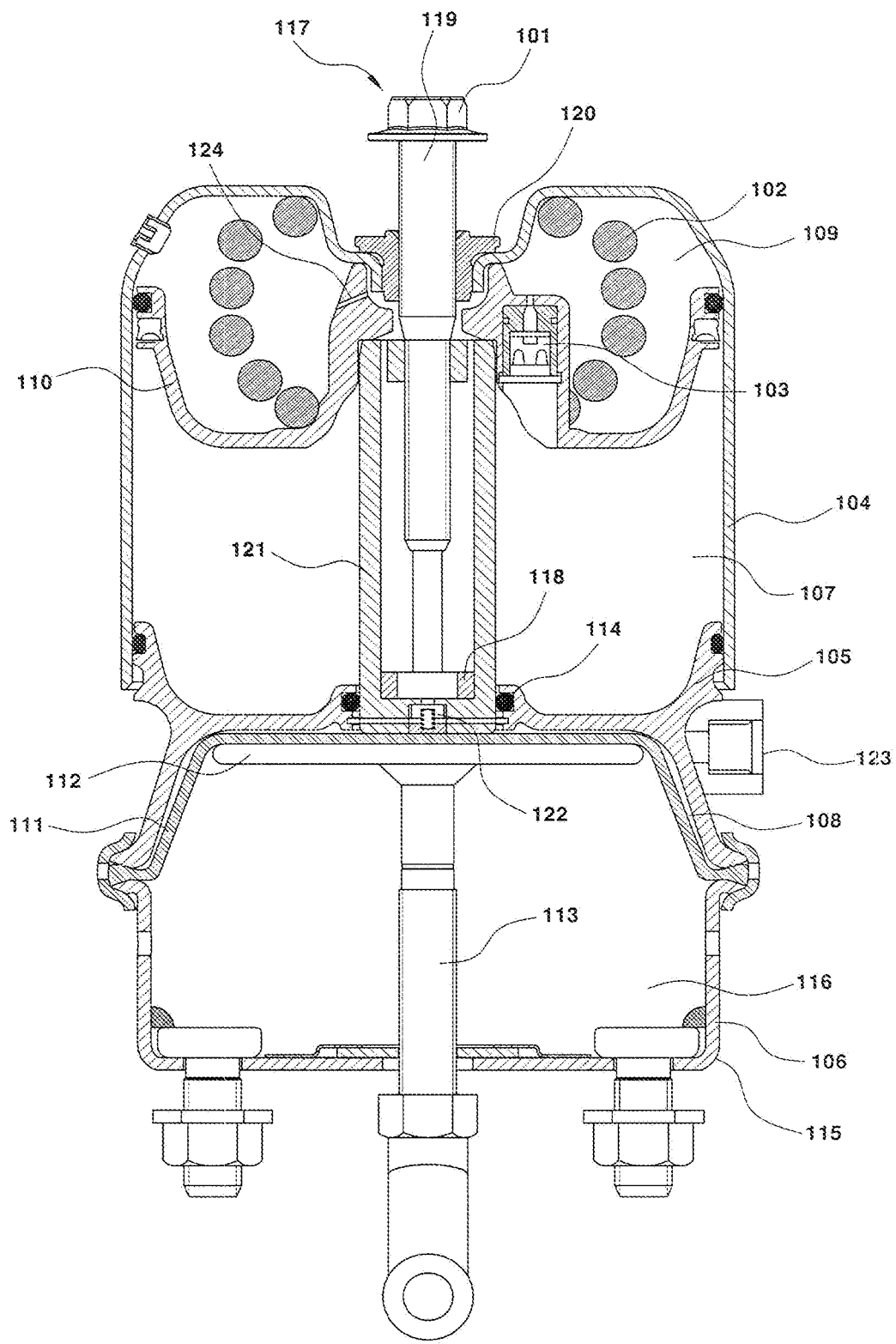
FIG. 3 is a cross-sectional view showing the brake actuator according to an embodiment of the present disclosure, before being mounted to a moving body.

FIG. 3 is a cross-sectional view showing the brake actuator according to an embodiment of the present disclosure, before being mounted to a moving body.

Generally, the caging state (CAG'G, before MTG) represents a state of the brake actuator during vehicle maintenance, and in this state, the brake actuator is not yet mounted to the vehicle, and thus no air flows into or out of each chamber. In addition, by locking the caging bolt 119 by turning to protrude upwards, the compression spring 102 is compressed through the piston 110.

Figure 4:
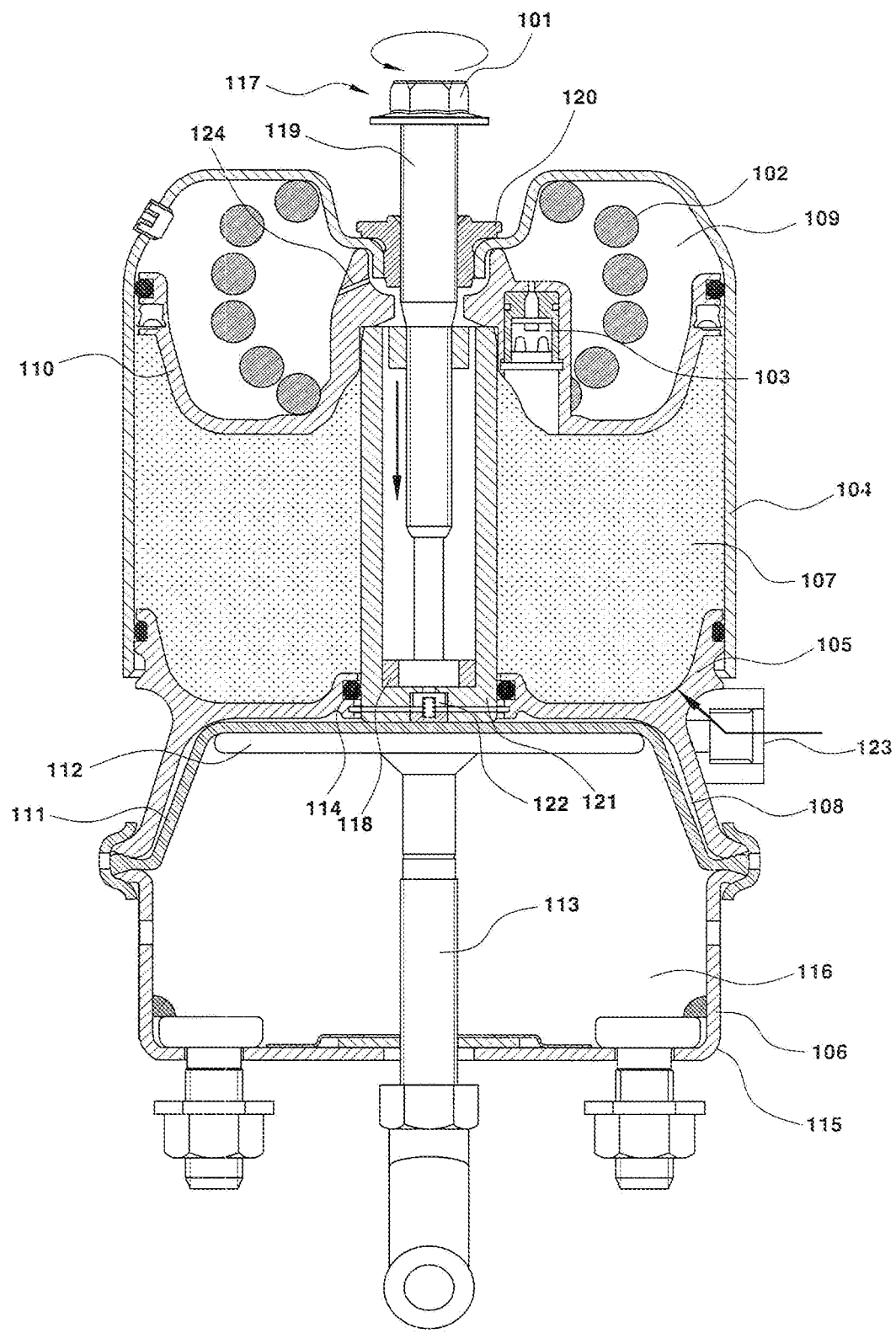
FIG. 4 is a cross-sectional view showing the brake actuator according to an embodiment of the present disclosure, which is mounted to a vehicle.

FIG. 4 is a cross-sectional view showing the brake actuator according to an embodiment of the present disclosure, which is mounted to a vehicle.

This state is also called an uncaging state (UNCAG'G), and in this state, the caging bolt 119 is released so that the compression spring 102 may be freely expanded and compressed. By releasing the caging bolt 119, the caging bolt 119 is inserted into the brake actuator. In addition, a fluid such as air is injected into the first pressure chamber 107 through the air supply hole 123 so that the brake is not locked. In this process, since the piston valve 103 is closed, the piston 110 moves upwards, and the compression spring 102 is naturally compressed.

Hereinafter, an operation of the brake actuator while a vehicle shifts from a running state to a parking state will be described with reference to FIG. 5.

Figure 5A:
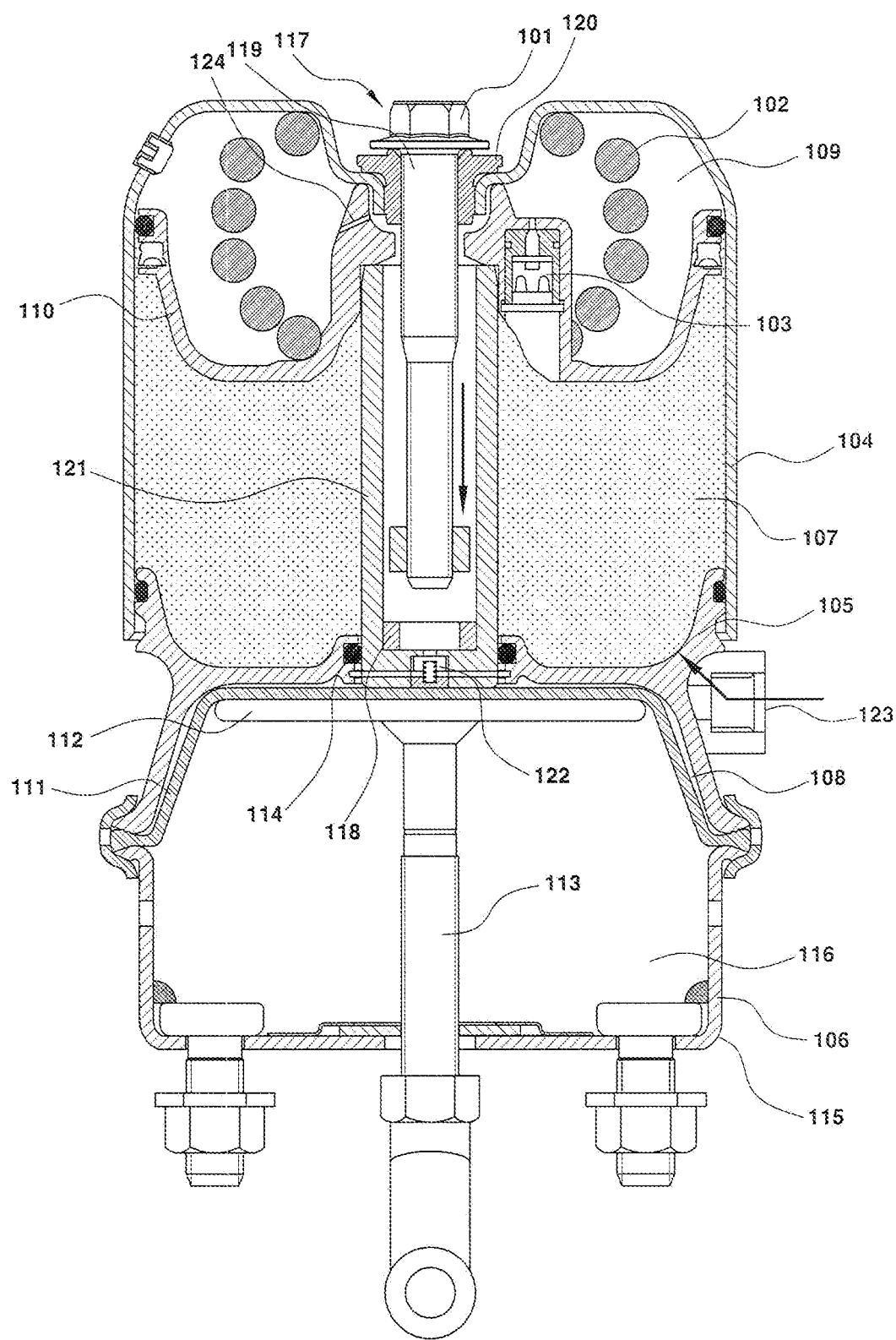
FIG. 5a is a first cross-sectional view for illustrating an operation of the brake actuator according to an embodiment of the present disclosure, in case a moving body such as a vehicle shifts from a running state into a parking state.

FIG. 5a is a first cross-sectional view for illustrating an operation of the brake actuator according to an embodiment of the present disclosure, in case a moving body such as a vehicle shifts from a running state into a parking state.

In this state, since the vehicle is still running, air is injected into the first pressure chamber 107, and since the piston valve 103 is closed, the brake is in a released state.

Figure 5B:
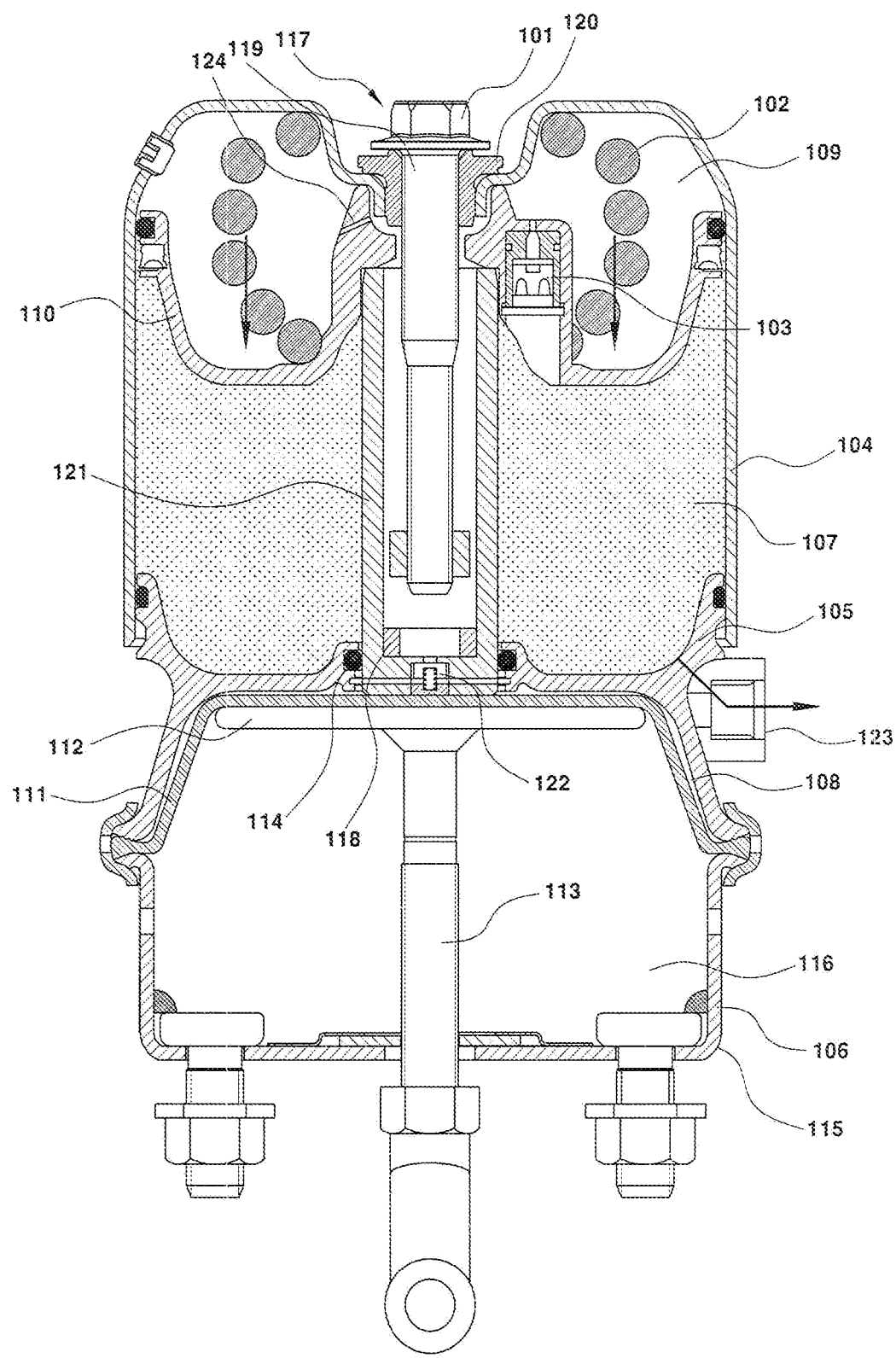
FIG. 5b is a second cross-sectional view for illustrating an operation of the brake actuator according to an embodiment of the present disclosure, in case a moving body such as a vehicle shifts from a running state into a parking state.

FIG. 5b is a second cross-sectional view for illustrating an operation of the brake actuator according to an embodiment of the present disclosure, in case a moving body such as a vehicle shifts from a running state into a parking state.

In order to lock the brake, the fluid such as air in the first pressure chamber 107 is discharged out through the air supply hole 123. Therefore, the air pressure of the first pressure chamber 107 decreases, and the compression spring 102 recovers its restoring force and pushes the piston 110 toward the first pressure chamber 107. In this process, the piston valve 103 is opened so that the air of the first pressure chamber 107 may partially flow to the spring chamber 109. Since the piston valve 103 is opened, the piston 110 may move more softly toward the first pressure chamber 107, and thus the brake may be smoothly locked.

Figure 5C:
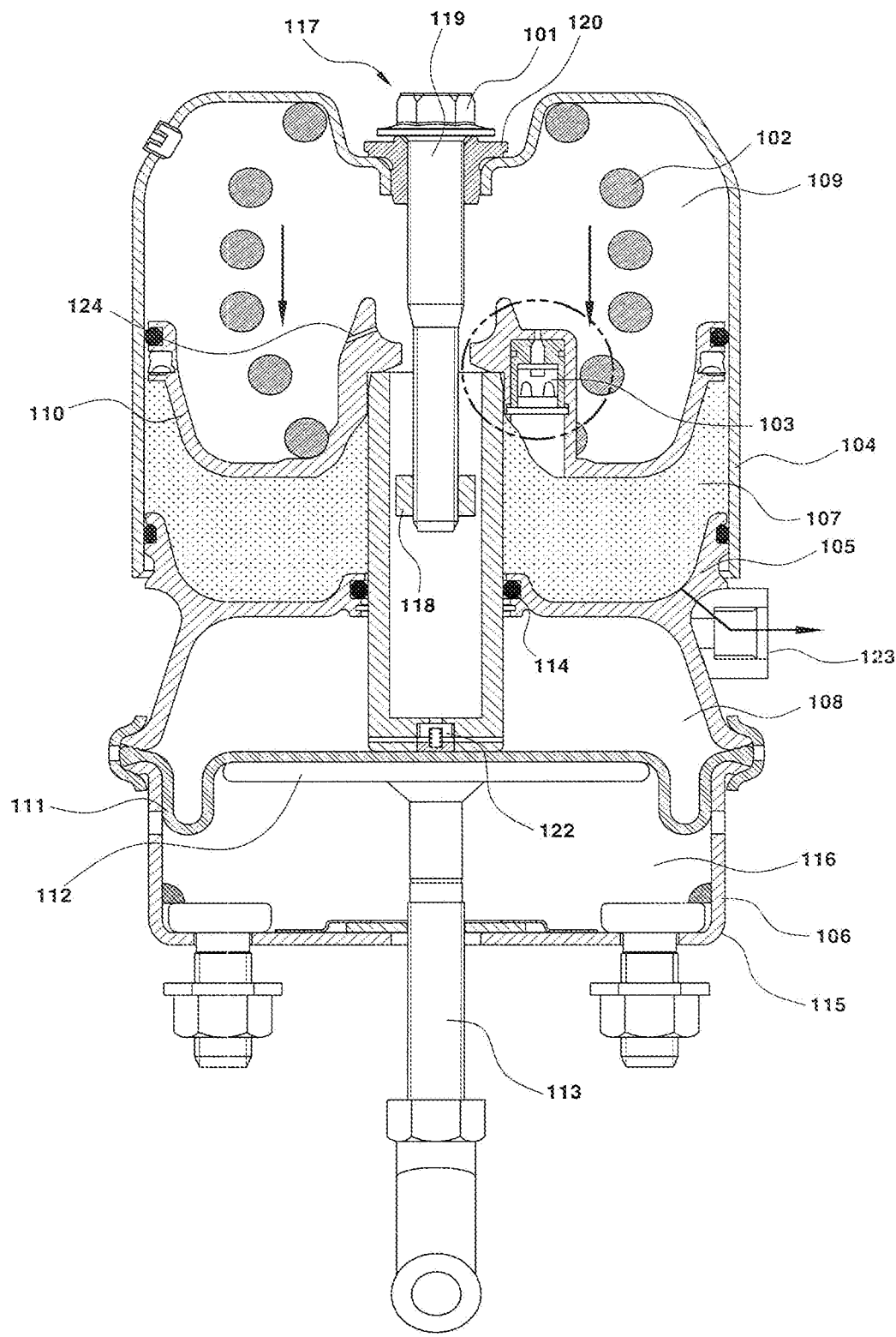
FIG. 5c is a third cross-sectional view for illustrating an operation of the brake actuator according to an embodiment of the present disclosure, in case a moving body such as a vehicle shifts from a running state into a parking state.

FIG. 5c is a third cross-sectional view for illustrating an operation of the brake actuator according to an embodiment of the present disclosure, in case a moving body such as a vehicle shifts from a running state into a parking state.

If the compression spring 102 recovers its restoring force and pushes the piston 110 to the bottom portion, the actuator rod 121 closely adhered to the piston 110 also moves downwards accordingly. As the actuator rod 121 moves downwards, the diaphragm 111 in contact with the actuator rod 121 also moves downwards together, and as a result the actuator rod 121 pushes the diaphragm 111 and the pressure plate 112 together to the bottom portion. By doing so, the push rod 113 connected to the pressure plate 112 allows the brake protruding out of the brake actuator to be in a locked state.

Figure 5D:
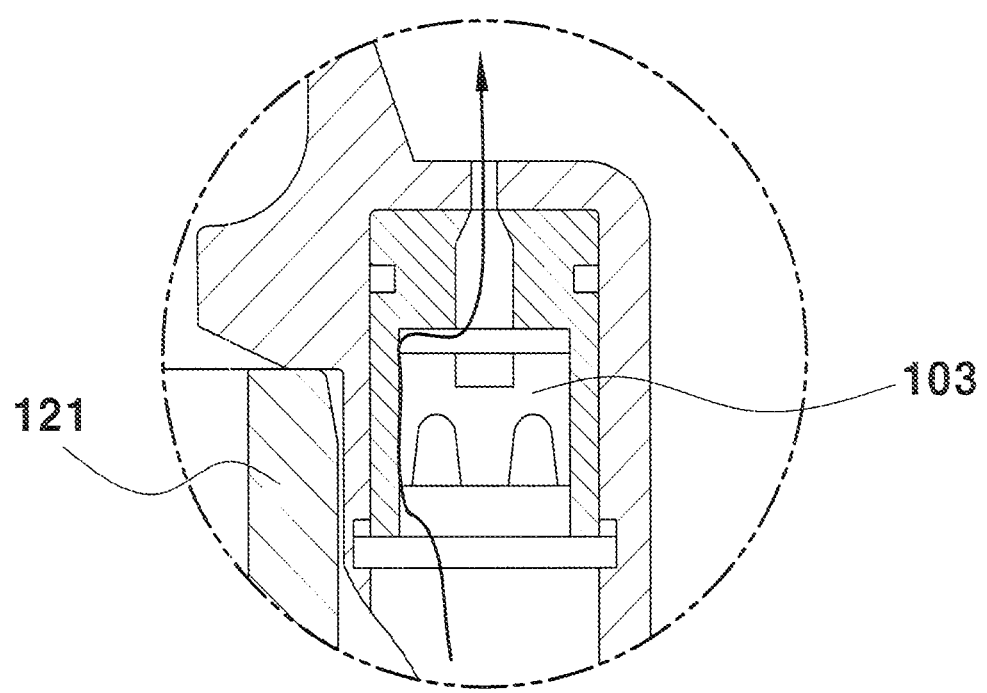
FIG. 5d is a cross-sectional view showing an operation state of a piston valve while a piston is moving to the lower end in FIG. 5c.

FIG. 5d is a cross-sectional view showing an operation state of a piston valve while a piston is moving to the lower end in FIG. 5c.

FIG. 5d shows that a fluid such as air flows from the first pressure chamber 107 to the spring chamber 109 through the piston valve 103. As the piston 110 moves downwards, the air pressure of the first pressure chamber 107 increases. The air of the first pressure chamber 107 may be discharged through a place where the fluid such as air is injected, but the discharging speed of the air may not be sufficiently faster in comparison to the descending speed of the piston 110. As a result, the descending speed of the piston 110 may be slowed for a while and thus the brake may not be smoothly locked. However, in the present disclosure, the piston valve 103 is provided to solve this problem. In detail, in the state where the piston 110 moves downwards, the piston valve 103 is opened so that the air of the first pressure chamber 107 may partially flow to the spring chamber 109. Therefore, even in a state where the air is not sufficiently discharged through the input/output passage, the piston 110 may move down by instantly responding to a brake locking command.

Hereinafter, FIG. 6 shows a state where the brake shifts from the locked state to the released state.

The brake is released by injecting air into the first pressure chamber 107 and the second pressure chamber 108. This is called an anti-compound, and the present disclosure proposes an example of a method for more smoothly releasing the brake. However, the present disclosure is not limited to this method, and air may be injected or introduced into each chamber in various ways to ensure more smooth operations of the brake actuator.

Figure 6A:
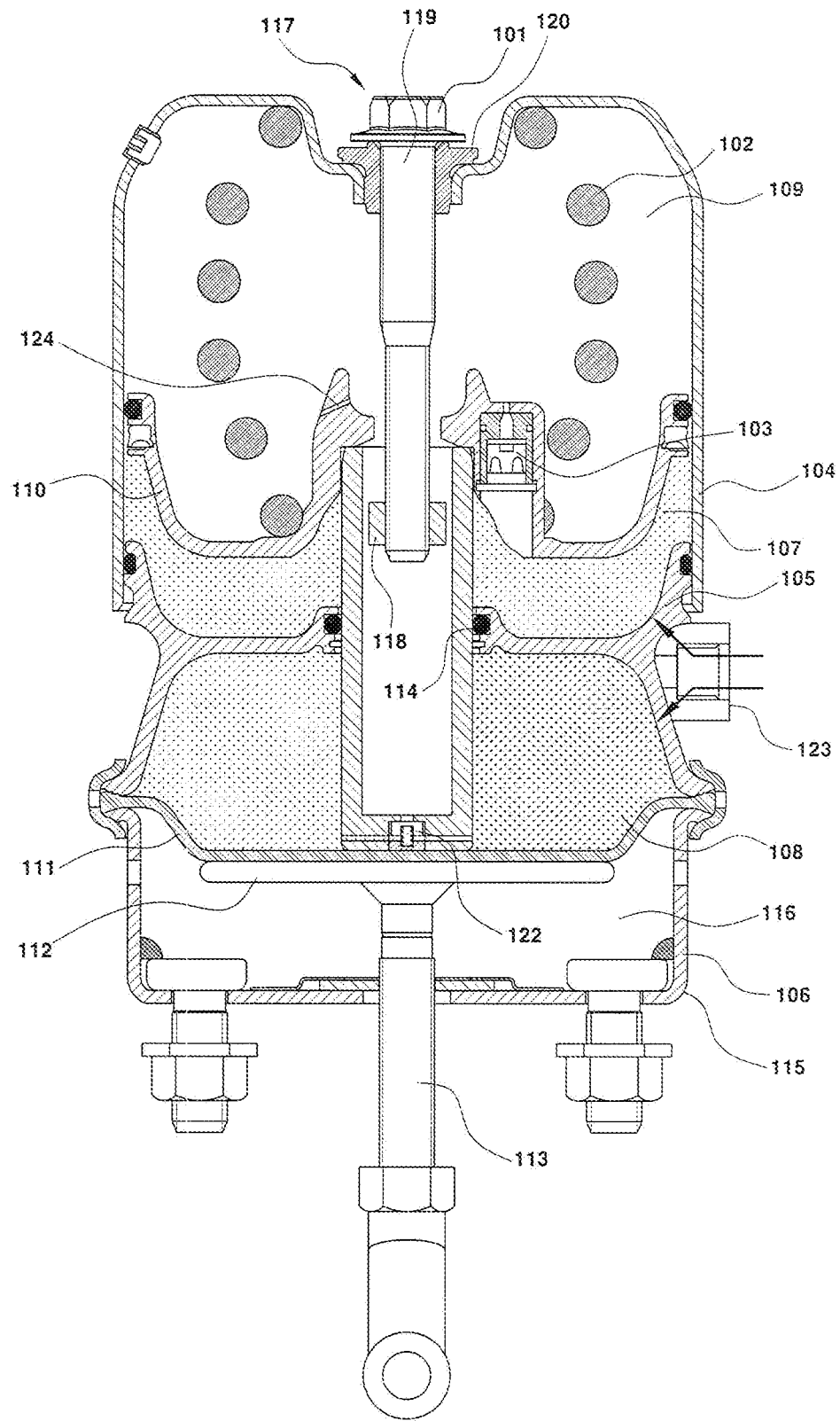
FIG. 6a is a first cross-sectional view for illustrating an operation of the brake actuator according to an embodiment of the present disclosure, in case a moving body such as a vehicle shifts from a parking state into a running state.

First, FIG. 6a is a first cross-sectional view for illustrating an operation of the brake actuator according to an embodiment of the present disclosure, in case a moving body such as a vehicle shifts from a parking state into a running state.

In order to release the brake again, a fluid such as air is injected into the first pressure chamber 107 and the second pressure chamber 108 through the air supply hole 123. If the air is injected into the first pressure chamber 107 and the second pressure chamber 108, the pressure in the chamber increases again and generates a force to lift the piston 110 upwards. In this process, the piston valve 103 first maintains a locked state, so that the piston 110 is moved upwards more rapidly to release the locked state of the brake. In addition, the actuator rod valve 122 is also in a locked state.

Figure 6B:
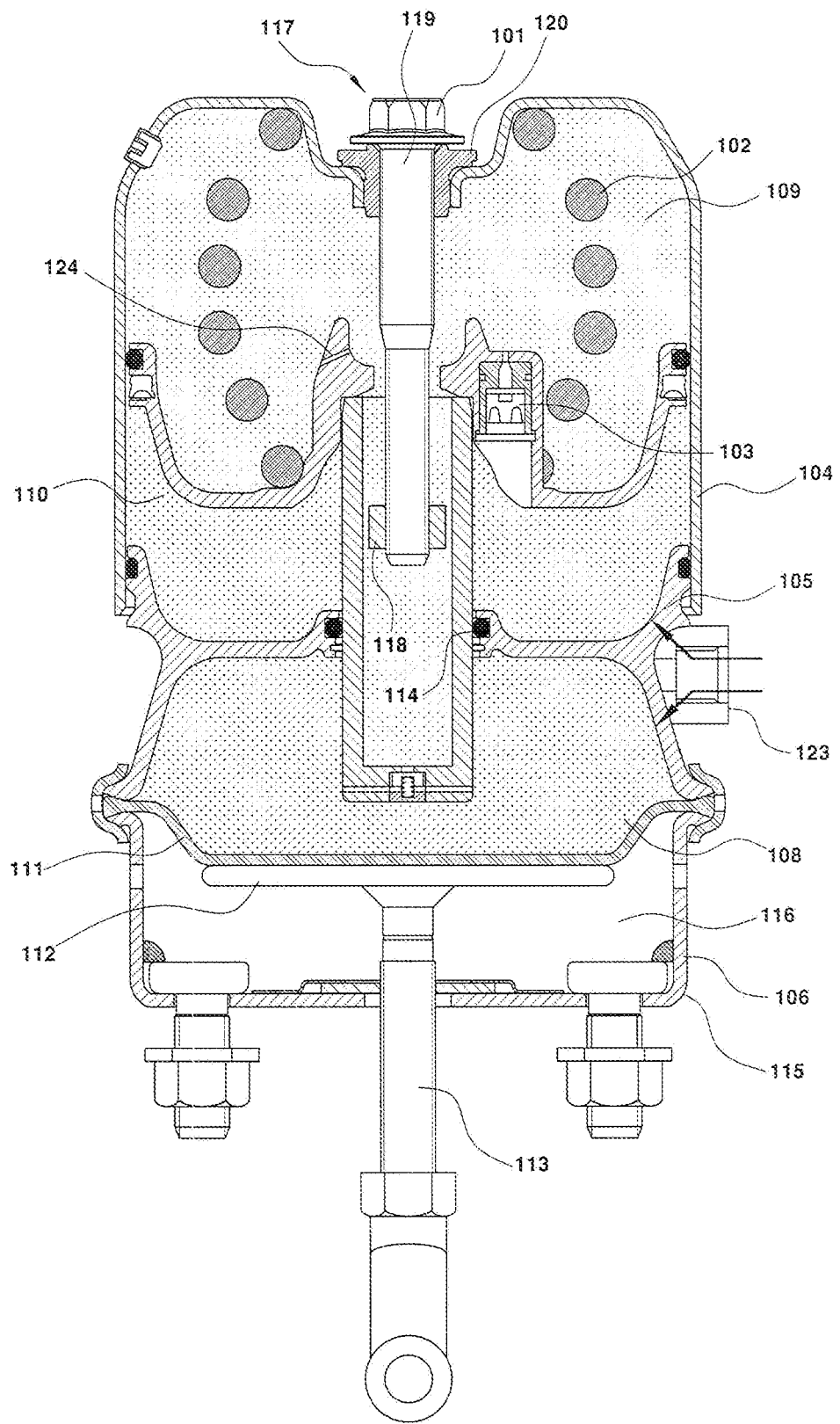
FIG. 6b is a second cross-sectional view for illustrating an operation of the brake actuator according to an embodiment of the present disclosure, in case a moving body such as a vehicle shifts from a parking state into a running state.

FIG. 6b is a second cross-sectional view for illustrating an operation of the brake actuator according to an embodiment of the present disclosure, in case a moving body such as a vehicle shifts from a parking state into a running state.

As the air is injected through the air supply hole 123, the piston 110 moves upwards, and the compression spring 102 is compressed. In this process, the air in the spring chamber 109 is also compressed. As the piston 110 moves upwards, the actuator rod 121 also moves upwards.

Figure 6C:
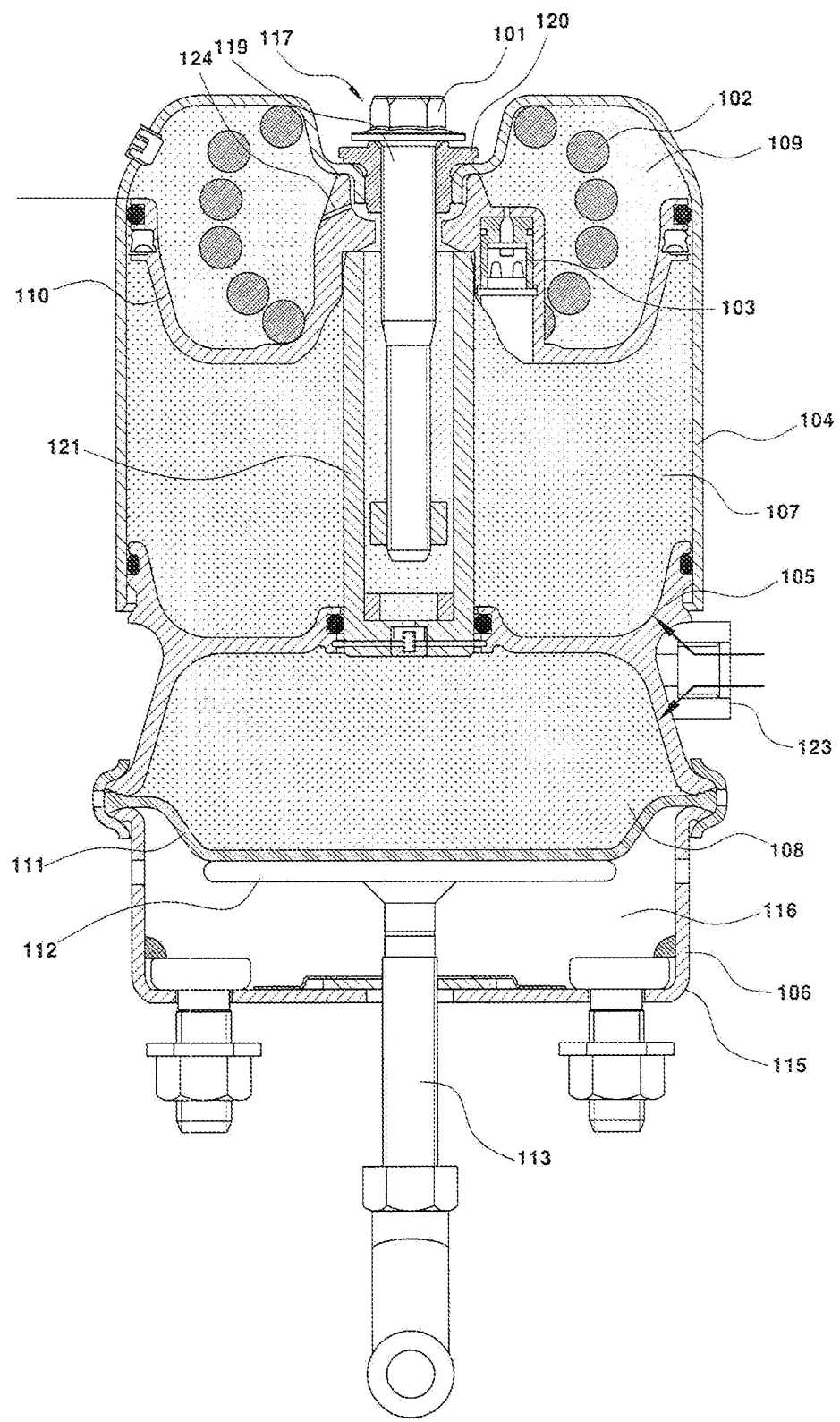
FIG. 6c is a third cross-sectional view for illustrating an operation of the brake actuator according to an embodiment of the present disclosure, in case a moving body such as a vehicle shifts from a parking state into a running state.

FIG. 6c is a third cross-sectional view for illustrating an operation of the brake actuator according to an embodiment of the present disclosure, in case a moving body such as a vehicle shifts from a parking state into a running state.

As the air is sufficiently injected into the first pressure chamber 107 and the second pressure chamber 108 through the air supply hole 123, the piston 110 is completely moved upwards to compress the compression spring 102 to the maximum. In this stage, the air in the spring chamber 109 is in a compressed state. The compressed air in the spring chamber 109 is repeatedly compressed and expanded due to repeated locking and releasing of the brake and resultantly thermally expanded to prevent the brake from be satisfactorily released.

Figure 6D:
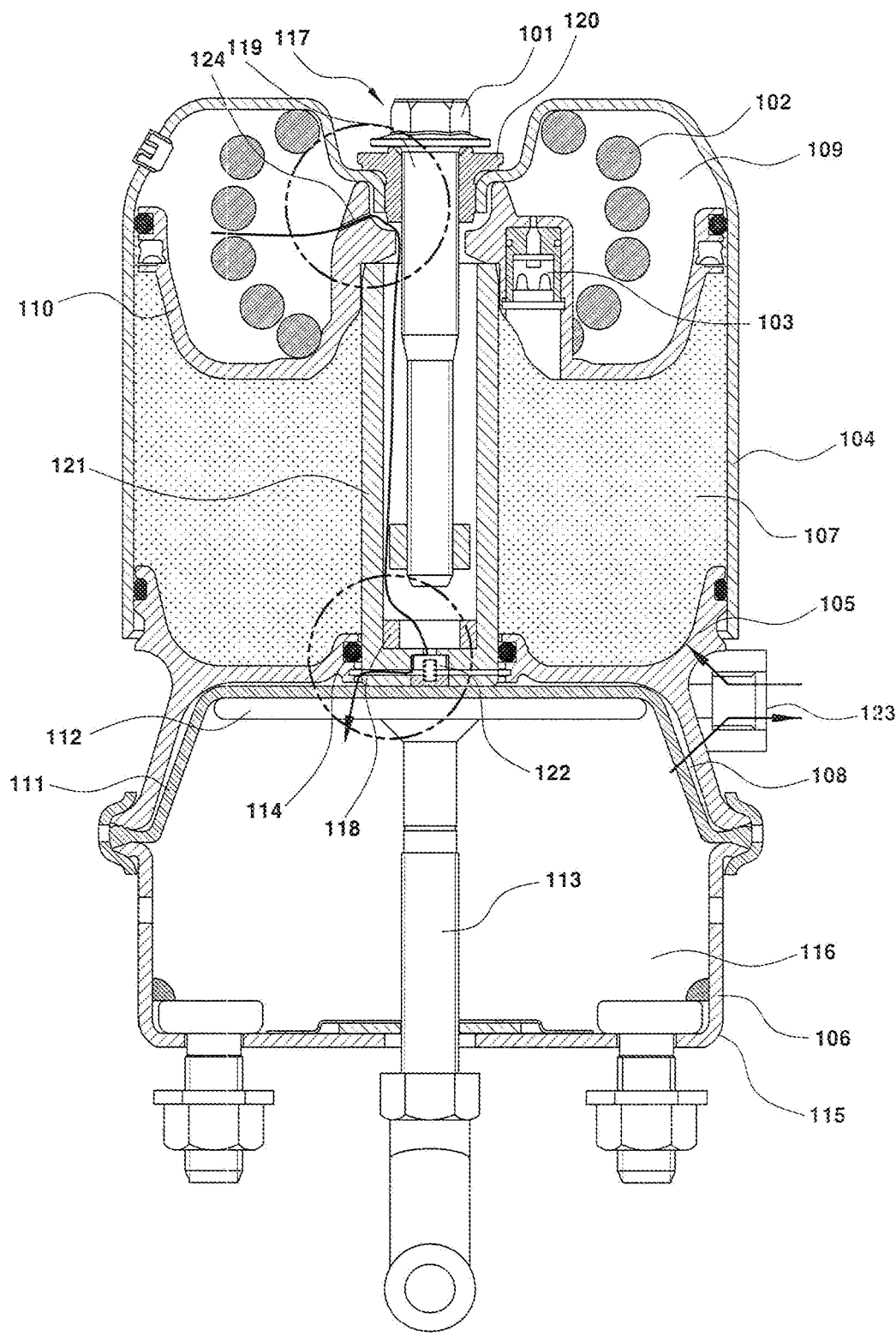
FIG. 6d is a fourth cross-sectional view for illustrating an operation of the brake actuator according to an embodiment of the present disclosure, in case a moving body such as a vehicle shifts from a parking state into a running state.

FIG. 6d is a fourth cross-sectional view for illustrating an operation of the brake actuator according to an embodiment of the present disclosure, in case a moving body such as a vehicle shifts from a parking state into a running state.

After the piston 110 is completely moved upwards to compress the compression spring 102, the air of the second pressure chamber 108 is discharged out. As a result, the push rod 113 is inserted into the brake actuator again, and the brake is released from the locked state. The push rod 113 may be moved upwards by forming a vacuum pressure in the second pressure chamber 108 or providing a restoring spring to a push rod chamber 116, without being limited thereto. If the push rod 113 is inserted into the brake actuator and moved entirely, the brake comes to a released state, and the moving body such as a vehicle may run again.

Figure 6E:
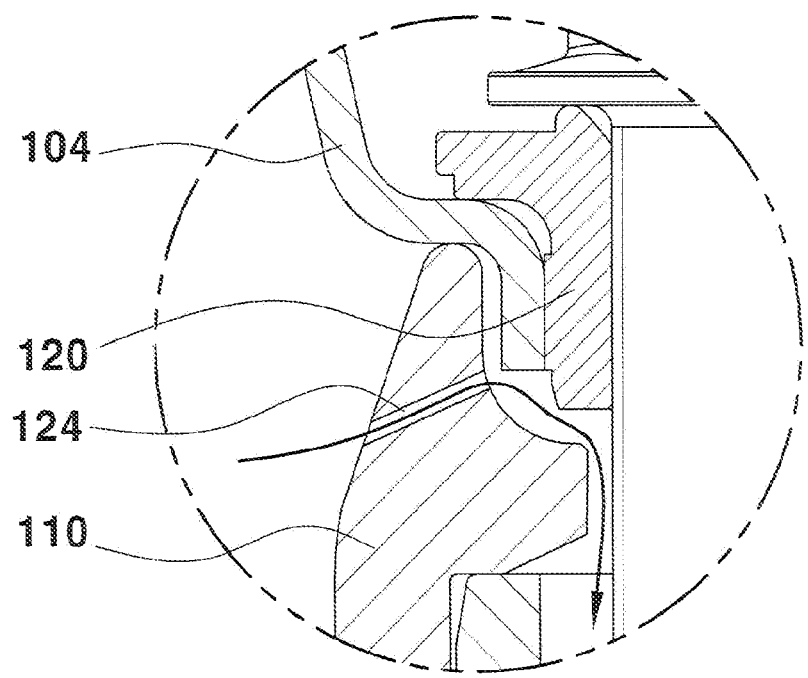
FIG. 6e is a cross-sectional view showing a state in which a compressed air of a spring chamber is moved to an actuator rod through an inner fluid moving hole.

FIG. 6e is a cross-sectional view showing a state in which a compressed air of a spring chamber is moved to an actuator rod through an inner fluid moving hole.

While the spring chamber 109 is being compressed, the air pressure therein increases. The increased air pressure is discharged out through the inner fluid moving hole 124 via the actuator rod 121 and the second pressure chamber 108.

Figure 6F:
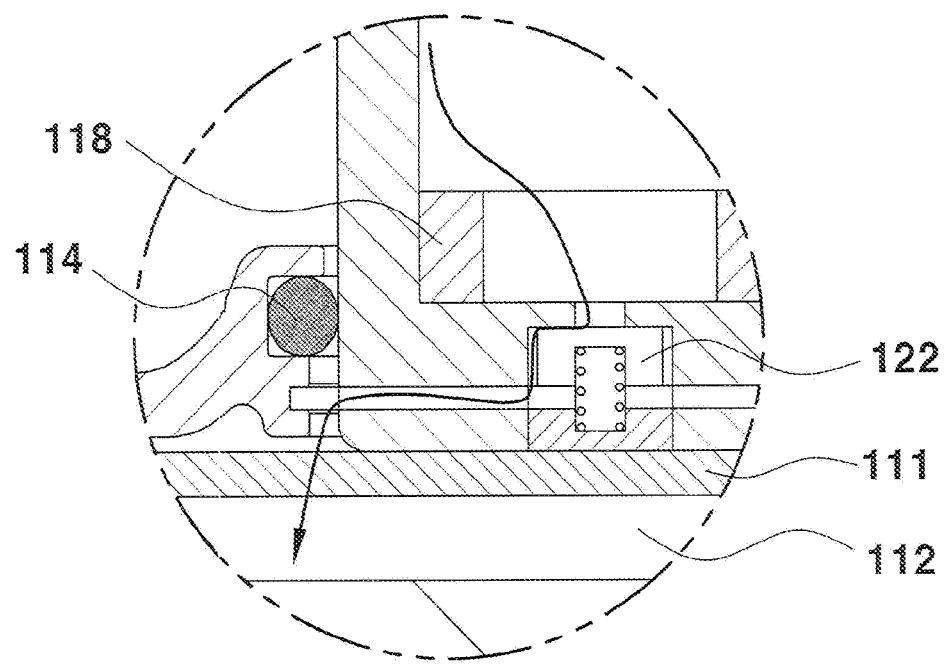
FIG. 6f is a cross-sectional view showing a state in which an air of the spring chamber is moved to a second pressure chamber through an actuator rod valve.

FIG. 6f is a cross-sectional view showing a state in which an air of the spring chamber is moved to a second pressure chamber through an actuator rod valve.

The air discharged through the inner fluid moving hole 124 of FIG. 6e reaches the actuator rod valve 122 through the actuator rod 121. Here, the actuator rod valve 122 may control the pressure in the spring chamber 109 by adjusting a flow rate of the air flowing to the second pressure chamber 108.

In addition, even though FIG. 6 illustrates a method for releasing the brake by applying pressure to the first pressure chamber 107 and the second pressure chamber 108 together and then discharging the air of the second pressure chamber 108, the brake may also be released just by injecting air only to the first pressure chamber 107. Even though the brake actuator of the present disclosure has been illustrated to lock or release a brake using a buffering stage by injecting air into the second pressure chamber 108 for a while in an intermediate process between the locking process and the releasing process and then discharging the air, which is called anti compound, the process of injecting a fluid such as air in FIG. 6 is just an example for describing the operation of the brake actuator according to the present disclosure, and the present disclosure is not limited thereto.

Operations of the brake actuator to shift from a locked state to a released state according to another embodiment will be described with reference to FIG. 7.

Figure 7A:
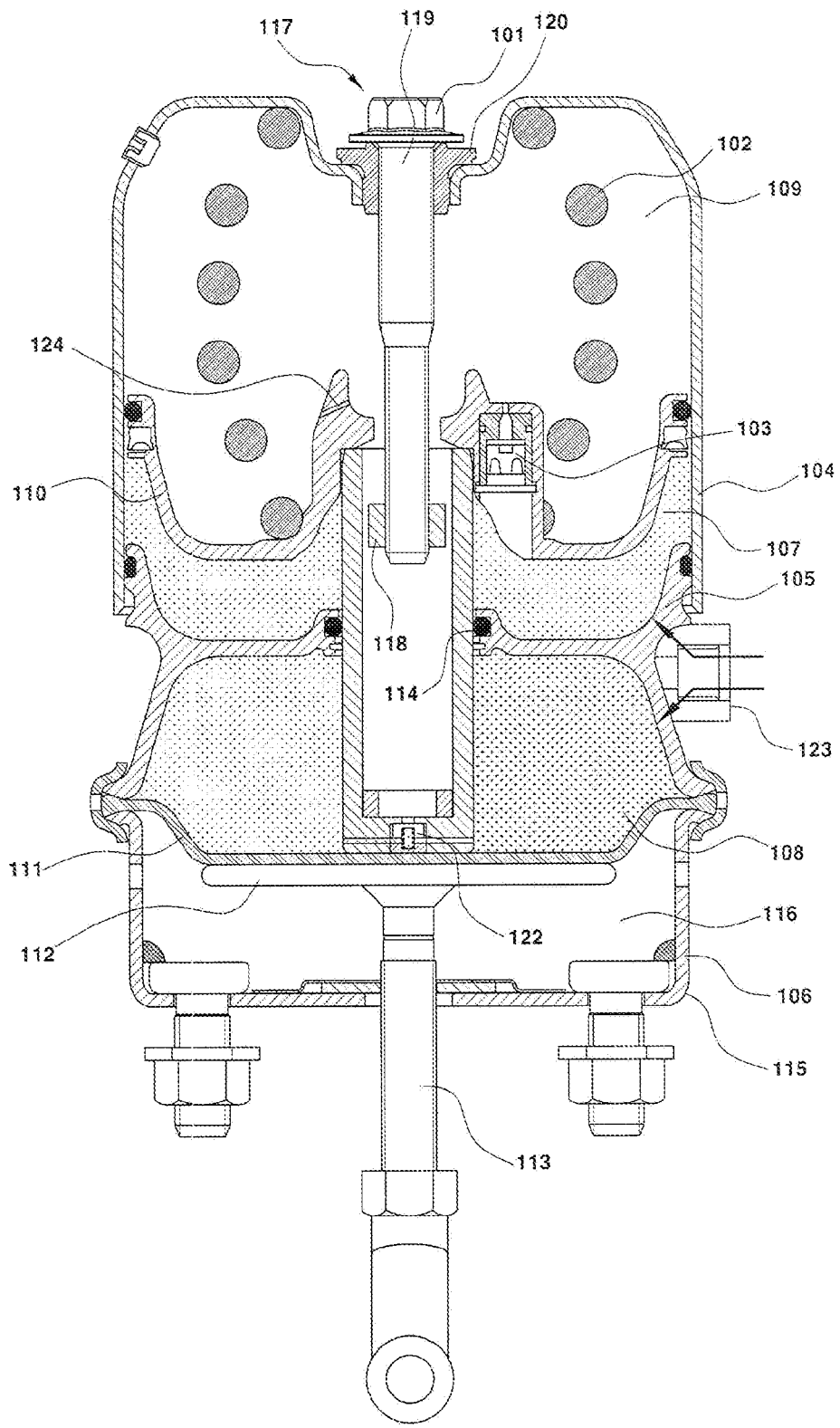
FIG. 7a is a first cross-sectional view for illustrating an operation of the brake actuator according to an embodiment of the present disclosure, in case a moving body such as a vehicle shifts from a parking state into a running state.

FIG. 7a is a first cross-sectional view for illustrating an operation of the brake actuator according to an embodiment of the present disclosure, in case a moving body such as a vehicle shifts from a parking state into a driving state.

In this state, the brake is in a locked state since the push rod 113 of the brake protrudes outwards to the maximum to contact a brake disk. In this state, in order to release the brake, air is injected into the first pressure chamber 107 and the second pressure chamber 108 through the air supply hole 123. Here, both the piston valve 103 and the actuator rod valve 122 are in a locked state.

Figure 7B:
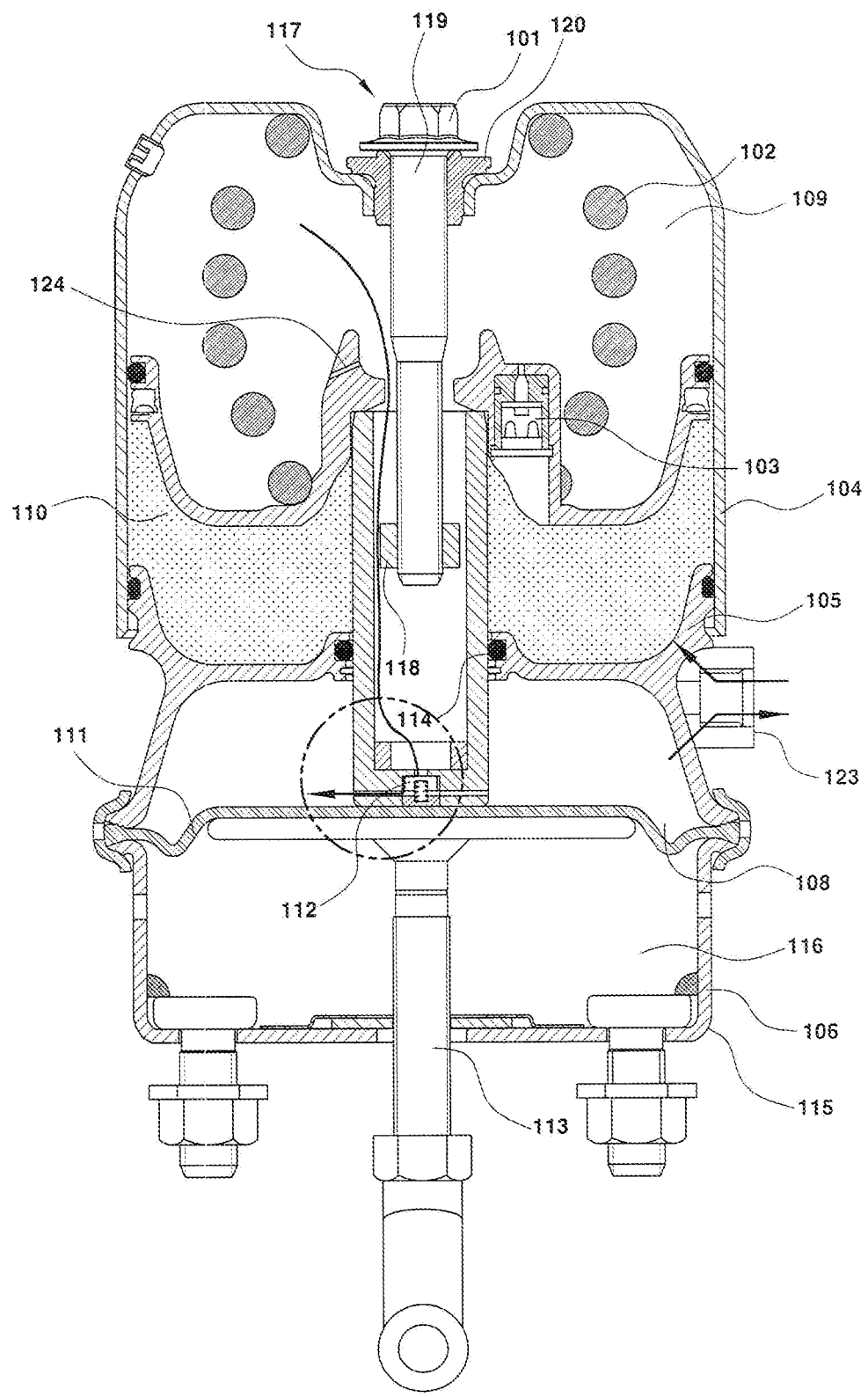
FIG. 7b is a second cross-sectional view for illustrating an operation of the brake actuator according to an embodiment of the present disclosure, in case a moving body such as a vehicle shifts from a parking state into a running state.

FIG. 7b is a second cross-sectional view for illustrating an operation of the brake actuator according to an embodiment of the present disclosure, in case a moving body such as a vehicle shifts from a parking state into a driving state.

In this state, the air is still injected into the first pressure chamber 107 through the air supply hole 123, and the air of the second pressure chamber 108 is discharged out through the air supply hole 123. Therefore, the piston 110 moves to the upper portion of the brake actuator, and the actuator rod 121 is also moved together. In more detail, in this stage, the piston valve 103 maintains the locked state so that the air pressure of the first pressure chamber 107 may be more rapidly transferred to the compression spring 102 to compress the compression spring 102, and the actuator rod valve 122 maintains an opened state so that the air of the spring chamber 109 is discharged to the second pressure chamber 108 through the actuator rod 121. Therefore, even though the piston 110 moves upwards, the air pressure of the spring chamber 109 does not increase, and thus the brake may be more rapidly locked and released.

Figure 7C:
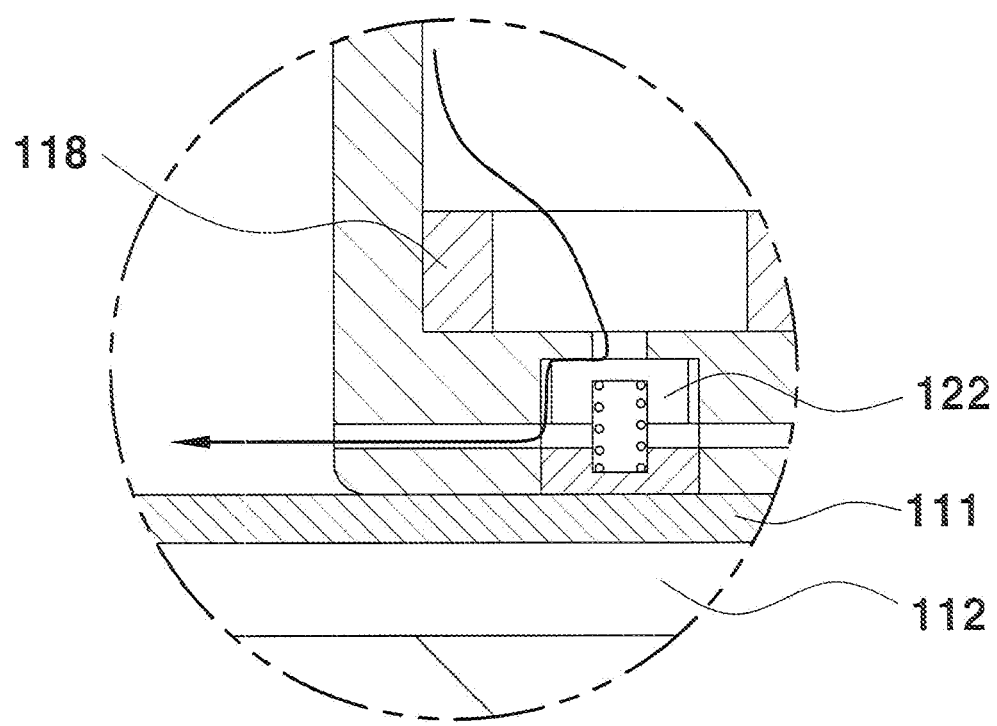
FIG. 7c is a cross-sectional view for illustrating an operation of an actuator rod valve of the brake actuator according to an embodiment of the present disclosure, in case a moving body such as a vehicle shifts from a parking state into a running state.

FIG. 7c is a cross-sectional view for illustrating an operation of an actuator rod valve of the brake actuator according to an embodiment of the present disclosure, in case a moving body such as a vehicle shifts from a parking state into a driving state.

From FIG. 7c, it may be understood that the air in the spring chamber 109 is drawn out through the actuator rod 121 via the second pressure chamber 108.

Figure 7D:
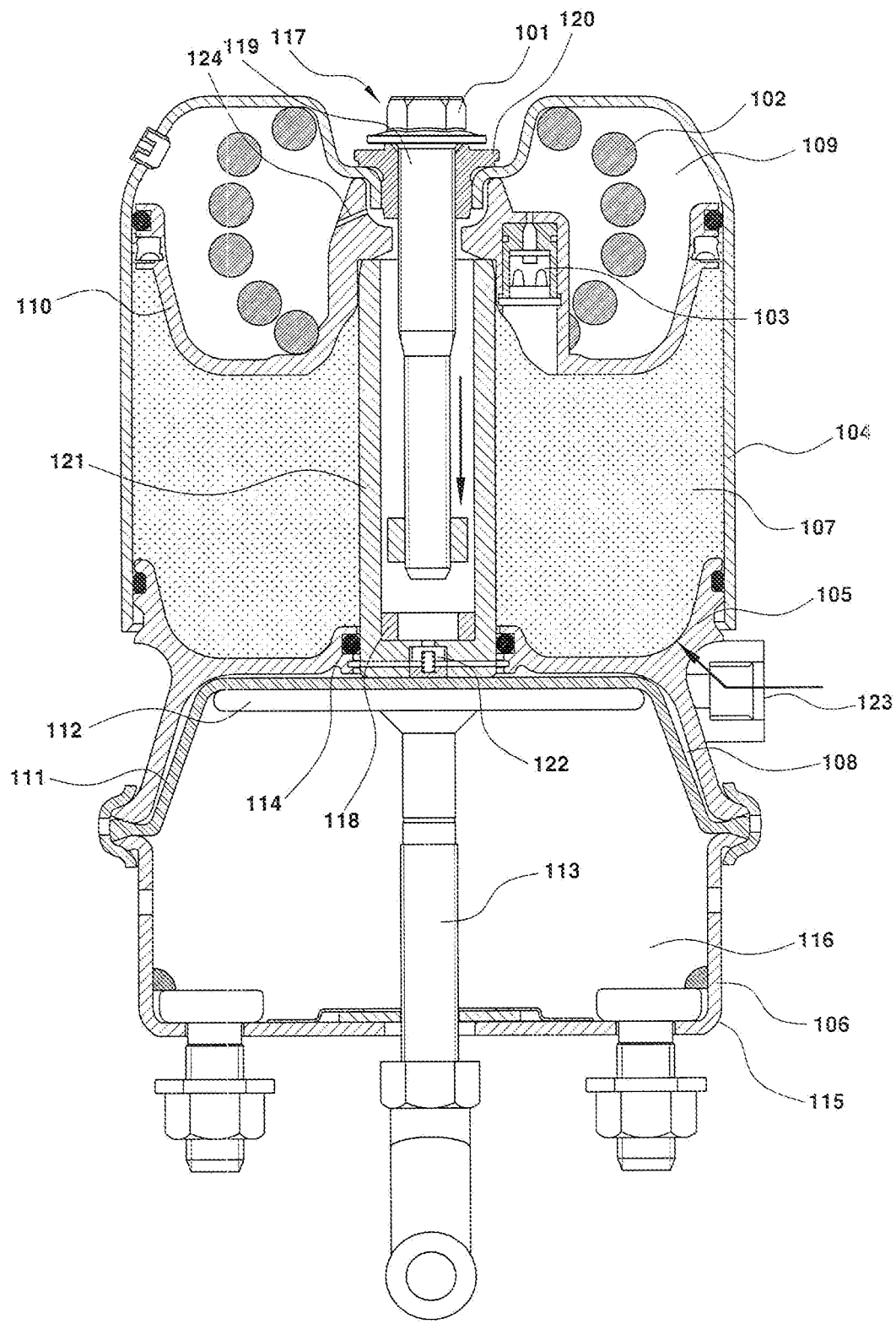
FIG. 7d is a third cross-sectional view for illustrating an operation of the brake actuator according to an embodiment of the present disclosure, in case a moving body such as a vehicle shifts from a parking state into a running state.

FIG. 7d is a third cross-sectional view for illustrating an operation of the brake actuator according to an embodiment of the present disclosure, in case a moving body such as a vehicle shifts from a parking state into a driving state.

The air is continuously injected into the first pressure chamber 107 of the air supply hole 123 so that the piston 110 is entirely moved upwards and the compression spring 102 is compressed to the maximum, and the air of the second pressure chamber 108 is entirely discharged out. As a result, the diaphragm 111 and the pressure plate 112 have moved upwards to be closely adhered to the lower surface of the adaptor housing 105, and the push rod 113 is also entirely inserted into the brake actuator so that the brake is released.

Figure 8:
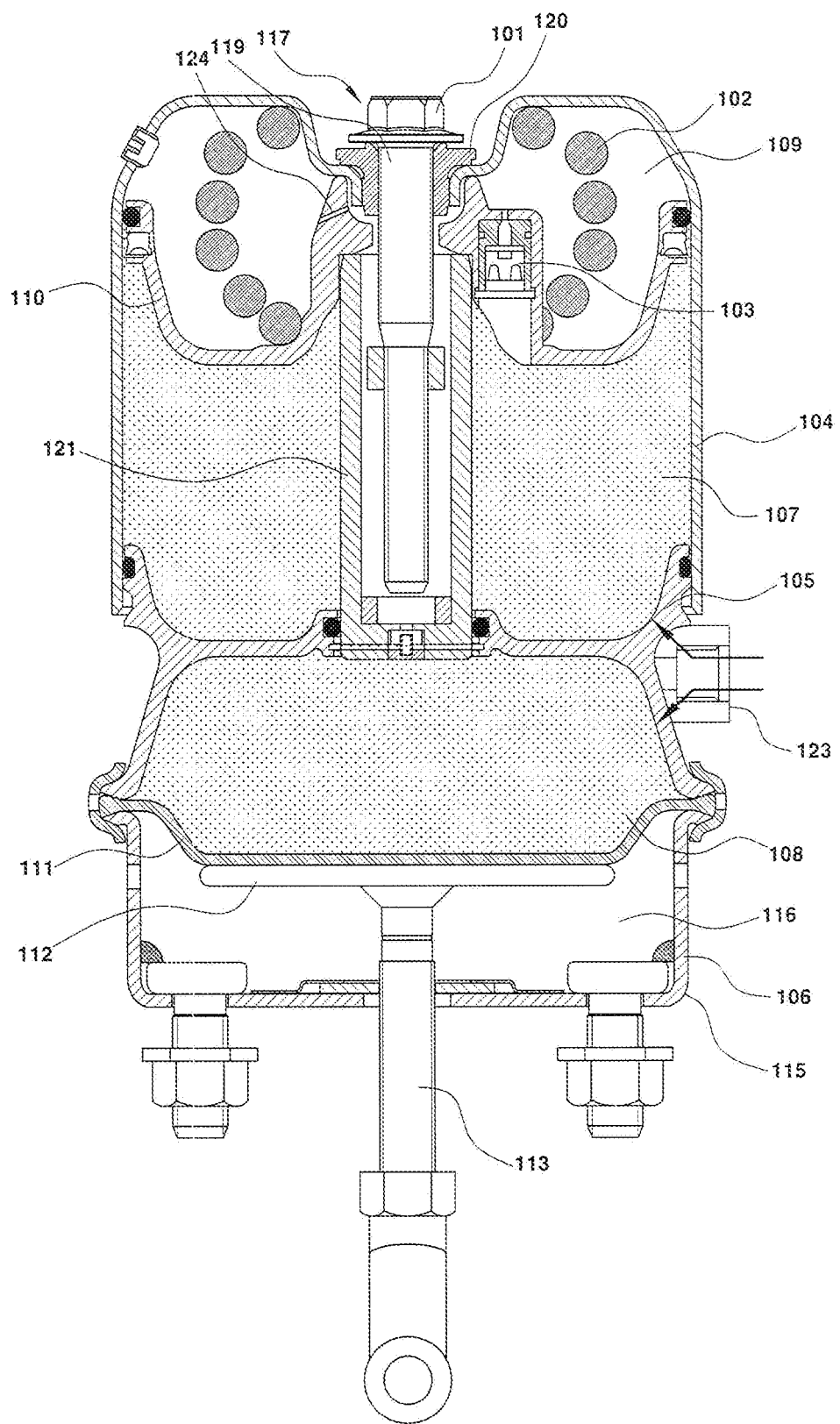
FIG. 8 is a cross-sectional view showing a locked process of the brake actuator according to an embodiment of the present disclosure, in case the brake is stepped while a moving body such as a vehicle is running.

FIG. 8 is a cross-sectional view showing a locked process of the brake actuator according to an embodiment of the present disclosure, in case the brake is stepped while a moving body such as a vehicle is running.

In this case, the air is continuously injected into the first pressure chamber 107, and a fluid such as air is rapidly injected into the second pressure chamber 108. Therefore, the air pressure of the second pressure chamber 108 increases, and since the actuator rod valve 122 is in a locked state, the increased air pressure pushes the diaphragm 111 downwards. As a result, the push rod 113 connected to the pressure plate 112 and the pressure plate 112 also moves downwards to lock the brake. This process locks the brake weakly in comparison to the case where the actuator rod 121 directly moves downwards to push the push rod 113 outwards, but it is possible to rapidly inject air into the second pressure chamber 108 to move the push rod 113 downwards. Therefore, the subject disclosure may be very useful if a rapid brake response is demanded.

Even though it has been illustrated that a brake is stepped in a vehicle during a brake actuator operating process, the present disclosure is not limited thereto, the present disclosure may be applied to all kinds of instruments using a brake actuator.

In addition, the present disclosure may be used for all kinds of instruments or applications which require a brake force, for example an elevator, even though not movable.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. An air operated brake actuator comprising:
   an upper housing having an opening at one end thereof and a through hole at the other end thereof;
   a lower housing having an opening at one end thereof and a through hole at the other end thereof;
   a coupling housing for coupling the upper housing and the lower housing to be fixed to each other;
   a piston having a through hole at a center thereof by dividing an inner side surface of the upper housing into a spring chamber and a pressure chamber;
   an inner fluid moving hole formed at one side of the piston to give a fluid flow path between the spring chamber and the pressure chamber of the lower housing through an actuator rod;
   a spring installed in the spring chamber;
   an actuator rod having openings at both ends so that one end is in contact with the through hole of the piston and the other end is inserted into a through hole at a top of the coupling housing;
   an actuator rod valve installed at a bottom of the actuator rod to adjust the flow of fluid between the spring chamber and the pressure chamber of the lower housing;
   a diaphragm for dividing the lower housing into a pressure chamber and a push rod chamber;
   a pressure plate contacting a bottom of the diaphragm to move vertically along the diaphragm;
   a push rod having one end perpendicularly coupled to a bottom of the pressure plate and the other end protruding outwards through the through hole of the lower housing; and
   a piston valve installed at the piston to adjust the flow of fluid between the spring chamber and the pressure chamber of the upper housing,
   wherein the inner fluid moving hole passes through the side of the piston close to the through hole of the piston,
   wherein the actuator rod valve is repeatedly locked and released to adjust air pressure in the spring chamber,
   wherein the piston valve is opened when the piston moves downward whereby air in the pressure chamber of the upper housing may partially flow to the spring chamber.

2. The air operated brake actuator of claim 1, wherein the inner fluid moving hole allows a fluid to flow through the actuator rod valve from the spring chamber to the pressure chamber of the lower housing so that the increase of pressure at the spring chamber or the pressure chamber of the upper housing is relieved when the spring chamber or the pressure chamber of the upper housing receives a fluid pressure over a predetermined level.

3. The air operated brake actuator of claim 1, wherein the piston valve allows a fluid to flow through the piston valve from the pressure chamber of the upper housing to the spring chamber so that the increase of pressure at the spring chamber or the pressure chamber of the upper housing is relieved when the spring chamber or the pressure chamber of the upper housing receives a fluid pressure over a predetermined level.

4. The air operated brake actuator of claim 1, wherein a region of the upper housing where a caging bolt is received has an S-shaped curved portion so that the spring is placed without link-to-link crosstalk while maintaining a center line thereof.

5. An air operated brake actuator comprising:
   an upper housing having an opening at one end thereof and a through hole at the other end thereof;
   a lower housing having an opening at one end thereof and a through hole at the other end thereof;
   an adaptor housing for coupling the upper housing and the lower housing;
   a piston having a through hole at a center thereof by dividing an inner side surface of the upper housing into a spring chamber and a first pressure chamber;
   an inner fluid moving hole formed at one side of the piston to give a fluid flow path;
   a compression spring installed in the spring chamber;
   an actuator rod having openings at both ends so that one end is in contact with the through hole of the piston and the other end is inserted into a through hole at a top of the adaptor housing;
   an actuator rod valve installed at a bottom of the actuator rod;
   a diaphragm for dividing the lower housing into a second pressure chamber and a push rod chamber;
   a pressure plate contacting a bottom of the diaphragm to move vertically along the diaphragm;
   a push rod having one end perpendicularly coupled to a bottom of the pressure plate and the other end protruding outwards through the through hole of the lower housing; and
   a piston valve installed at the piston to adjust the flow of fluid between the spring chamber and the first pressure chamber, wherein the inner fluid moving hole passes through the side of the piston close to the through hole of the piston, wherein the actuator rod valve is repeatedly locked and released to adjust air pressure in the spring chamber, wherein the piston valve is opened when the piston moves downward whereby air in the first pressure chamber may partially flow to the spring chamber.

6. The air operated brake actuator of claim 5, wherein the inner fluid moving hole allows a fluid to flow through the actuator rod valve from the spring chamber to the second pressure chamber so that the increase of pressure at the spring chamber or the first pressure chamber is relieved when the spring chamber or the first pressure chamber receives a fluid pressure over a predetermined level.

7. The air operated brake actuator of claim 5, wherein the piston valve allows a fluid to flow through the piston valve from the first pressure chamber to the spring chamber so that the increase of pressure at the spring chamber or the first pressure chamber is relieved when the spring chamber or the first pressure chamber receives a fluid pressure over a predetermined level.

8. The air operated brake actuator of claim 5, wherein a region of the upper housing where a caging bolt is received has an S-shaped curved portion so that the spring is placed without link-to-link crosstalk while maintaining a center line thereof.

* * * * *